United States Patent [19]
Loewen et al.

[11] Patent Number: 6,053,812
[45] Date of Patent: Apr. 25, 2000

[54] SIEVE CONSTRUCTION FOR A COMBINE HARVESTER

[75] Inventors: Warren D. Loewen; Lin C. Loewen; Dave W. Giesbrecht, all of Altona; Herman Neufeld, Gretna, all of Canada

[73] Assignee: Loewen Manufacturing Co., Altona, Canada

[21] Appl. No.: 08/976,611

[22] Filed: Nov. 24, 1997

[51] Int. Cl.[7] .................................................. A01F 12/32
[52] U.S. Cl. .......................................... 460/101; 460/109
[58] Field of Search ............................... 460/101, 85, 94, 460/95, 102, 108, 122, 902, 109

[56] References Cited

U.S. PATENT DOCUMENTS

| | | | |
|---|---|---|---|
| 4,770,190 | 9/1988 | Barnett | 460/102 |
| 5,462,174 | 10/1995 | Truckenbrod et al. | 460/101 X |

FOREIGN PATENT DOCUMENTS

| | | | |
|---|---|---|---|
| 492 588 | 5/1953 | Canada | 460/95 |

OTHER PUBLICATIONS

Harvest Air, spot welded sieves graph on page 1, all of page 2.

*Primary Examiner*—Thomas B. Will
*Assistant Examiner*—Arpad Fabian Kovacs
*Attorney, Agent, or Firm*—Adrian D. Battison; Murray E. Thrift

[57] ABSTRACT

A sieve for use in a combine harvester includes a plurality of longitudinal parallel rails lying in a common plane of the sieve including two spaced side rails and at least one intermediate rail. Each rail has a row of holes supporting a plurality of parallel cross wires of square cross-section extending generally at right angles to the rails with each wire passing through a respective one of the holes. Each wire carries a plurality of separate louver sections thereon, each louver section spanning a distance between a respective pair of the rails. A common adjustment member for the wires causes common rotation of each of the wires about a longitudinal axis to cause rotation of the louver sections to adjust the louver openings. Each louver section has formed a square sleeve through which the wire passes without welding to the wire so that the wire can be pulled longitudinally relative to the louver sections for removal of individual louver sections for repair.

21 Claims, 4 Drawing Sheets

FIG. 5

SIEVE CONSTRUCTION FOR A COMBINE HARVESTER

This invention relates to a sieve construction for a combine harvester.

BACKGROUND OF THE INVENTION

It is well known that the conventional combine harvester includes one or more sieve elements at the rear of the body for separating seeds from the chaff. Generally two such elements are used one above the other so that two subsequent separation steps are effected.

In many cases the upper sieve element is known as the chaffer and the lower sieve element is known as the sieve. The elements are however of very similar construction and the present invention is directed to either of these elements. Thus the term "sieve" used in this specification is intended to relate to either or both of the elements or to any similar construction of a combine harvester which provides a series of openings for acting as a sieve to separate seeds from chaff.

Generally the construction comprises a plurality of parallel longitudinal rails. Across the rails are provided a plurality of longitudinally spaced parallel wires which pass through aligned holes in the rails. On each wire is attached a plurality of separate louver sections which are carried by the wire and provide fingers extending forwardly from the wire. The fingers of each wire co-operate with the louver sections of the next wire to form openings through which air can be directed from below by a fan to all areas of the sieve construction and through which seeds can pass under gravity for collection on the sieve underneath or for collection in a suitable collection system well known to one skilled in the art.

The wires are connected to the louver sections by welding so that each louver section is held at a predetermined angle relative to the wire. The wires are round in cross section and simply pass through round hole stitching in the louver or lay flat against the louver. The wires pass through simple holes in the rails and are supported thereby. Rotation of the wires relative to the rails is effected only for adjustment of the angle of the louvers and this is done very infrequently and in some cases as infrequently as a few times during harvest depending upon the crop material to be separated. There is therefore no rotation of the wires relative to the rails which would effect wear of the wires and therefore the rails simply have a hole through which the wire passes without generally the necessity for any kind of bearing arrangement.

The adjustment movement is effected by a longitudinal rod parallel to the rails which is moved back and forth by an adjustment lever and acts to push a portion of the wire forwardly and backwardly to twist that portion about a longitudinal axis of a main portion of the wire.

The welding of the louver sections to the wire provides a substantially rigid construction and holds the rails at the required spaced positions due to the engagement of the ends of the louver sections with the sides of the rails.

This arrangement has been manufactured for many years and is adopted in substantially all combine harvesters.

One arrangement manufactured by HARVEST AIR in Australia has attempted to improve the sieve construction by providing in each rail a slot from the top edge downwardly and the wires are inserted into plastic hanger members at each rail which are shaped to fit into the slot. This arrangement allows the wires to be pulled vertically upwardly from the rails for separation therefrom. The plastic hangers provide some resilience of the wires relative to the rails. The plastic hangers are fixed in the rails and the wires are circular so they rotate within the holes in the plastic hanger. This arrangement allows one wire and its attached louvers to be lifted from the rails and replaced in the event of damage or wear. However this arrangement is not widely used and is not used in North America.

However, apart from the little known Australian arrangement above, all of these constructions have the disadvantage that it is very difficult to disassemble the sieve construction once completed so that it is impractical to replace any elements of the sieve construction and once damaged or worn the complete sieve construction is abandoned and replaced by a new assembly. In the current climate of recycling and reuse, this is of course unacceptable.

Yet further the sieve construction in view of its welded formation is difficult to provide modifications which would provide a different shape of a number of the louvers so that the sieve can be tailored for particular crops or particular conditions. The current manufacturers take the position that the sieve is commercially available at a relatively inexpensive price and therefore the customer should take the construction that is available.

SUMMARY OF THE INVENTION

It is one object of the present invention, therefore to provide an improved sieve construction for use in a combine harvester.

According to one aspect of the invention there is provided a sieve for use in a combine harvester comprising:

a plurality of longitudinal parallel rails lying in a common plane of the sieve including two spaced side rails and at least one intermediate rail;

each rail having a row of holes therealong;

a plurality of parallel cross wires extending generally at right angles to the rails in the common plane and arranged at longitudinally spaced positions along the rails;

each wire passing through a respective one of the holes in each of the rails such that the holes associated with each wire are aligned across the sieve and such that the wires are supported by the rails;

each wire carrying a plurality of separate louver sections thereon, each louver section having a length along the wire so as substantially to span a distance between a respective pair of the rails such that the louver sections of each wire combine to substantially span a distance between the side rails;

the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;

a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;

each wire being non-circular in cross-section;

each louver section of each wire having formed openings therein shaped to cooperate with the cross-section of the wire to prevent rotation relative to the wire of the louver section in a direction about the axis of the wire;

and each louver section being connected to the wire by the engagement of the formed openings with the wire without welding to the wire such that the wire can be pulled longitudinally relative to the louver sections.

Preferably the wire is shaped in cross-section so as to define corners for engaging the formed openings in the louver sections.

Preferably the louver sections are formed from sheet metal which is punched and shaped to define alternate raised and depressed portions across the louver section which pass respectively above and below the wire so as to define a duct across the louver section through which the wire passes, the duct being shaped in cross-section to match the cross-section of the wire.

Preferably the louver section includes a plurality of fingers projection forwardly from the wire and defining said openings therebetween, each finger projection forwardly from a respective one of said alternate raised and depressed portions.

Preferably the holes in the rails each contain a cushion sleeve with an inner bore of the sleeve surrounding the wire and an outer surface of the sleeve engaging the hole in the rail, the inner bore being shaped to match the cross-section of the wire and the outer surface being circular to rotate in the hole with the rotation of the wire.

Preferably the cushion sleeve has a projection portion on at least one end extending beyond an adjacent side surface of the rail, an adjacent one of the louver sections including a recess at a side edge thereof at the wire receiving the projection portion therein.

Preferably the cushion sleeve has a projection portion at each end extending beyond an adjacent side surface of the rail, each adjacent one of the louver sections including a recess at a side edge thereof at the wire receiving a respective one the projection portions therein.

Preferably each of the wires adjusted by said common adjustment member includes an adjustment lever thereon having a base portion with an opening therein shaped to match the cross-section of the wire and a lever portion extending therefrom in a direction radial of the wire, the lever portion having an engagement element thereon for engaging the common adjustment member.

Preferably the common adjustment member comprises a rod extending parallel to the rails underneath the wires with a plurality of holes therein each associated with a respective one of the wires cooperating therewith, the engagement element comprising a pin extending at right angles to the lever portion into a respective one of the holes.

Preferably the holes in the rails each contain a cushion sleeve with an inner bore of the sleeve surrounding the wire and an outer surface of the sleeve engaging the hole in the rail, the inner bore being shaped to match the cross-section of the wire and the outer surface being circular to rotate in the hole with the rotation of the wire and wherein each of the wires adjusted by said common adjustment member includes an adjustment lever thereon having a base portion integral with the cushion sleeve and a lever portion extending from the cushion sleeve in a direction radial of the wire, the lever portion having an engagement element thereon for engaging the common adjustment member.

According to a second aspect of the invention there is provided sieve for use in a combine harvester comprising:

a plurality of longitudinal parallel rails lying in a common plane of the sieve including two spaced side rails and at least one intermediate rail;

each rail having a row of holes therealong;

a plurality of parallel cross wires extending generally at right angles to the rails in the common plane and arranged at longitudinally spaced positions along the rails;

each wire passing through a respective one of the holes in each of the rails such that the holes associated with each wire are aligned across the sieve and such that the wires are supported by the rails;

each wire carrying a plurality of separate louver sections thereon, each louver section having a length along the wire so as substantially to span a distance between a respective pair of the rails such that the louver sections of each wire combine to substantially span a distance between the side rails;

the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;

a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;

each wire being non-circular in cross-section;

each louver section of each wire having formed openings therein shaped to cooperate with the cross-section of the wire to prevent rotation relative to the wire of the louver section in a direction about the axis of the wire;

wherein the holes in the rails each contain a cushion sleeve with an inner bore of the sleeve surrounding the wire and an outer surface of the sleeve engaging the hole in the rail, the inner bore being shaped to match the cross-section of the wire for rotation of the cushion sleeve with the wire and the outer surface being circular to rotate in the hole with the rotation of the wire.

According to a third aspect of the invention there is provided a sieve for use in a combine harvester comprising:

a plurality of longitudinal parallel rails lying in a common plane of the sieve including two spaced side rails and at least one intermediate rail;

each rail having a row of holes therealong;

a plurality of parallel cross wires extending generally at right angles to the rails in the common plane and arranged at longitudinally spaced positions along the rails;

each wire passing through a respective one of the holes in each of the rails such that the holes associated with each wire are aligned across the sieve and such that the wires are supported by the rails;

each wire carrying a plurality of separate louver sections thereon, each louver section having a length along the wire so as substantially to span a distance between a respective pair of the rails such that the louver sections of each wire combine to substantially span a distance between the side rails;

the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;

a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;

each wire being non-circular in cross-section;

each louver section of each wire having formed openings therein shaped to cooperate with the cross-section of the wire to prevent rotation relative to the wire of the louver section in a direction about the axis of the wire;

wherein the holes in the rails each contain a cushion sleeve with an inner bore of the sleeve surrounding the wire and an outer surface of the sleeve engaging the hole in the rail, the inner bore being shaped to match the cross-section of the wire and the outer surface being circular to rotate in the hole with the rotation and wherein each of the wires adjusted by said common adjustment member includes an adjustment lever thereon having a base portion integral with one of the cushion sleeves and a lever portion extending from the cushion sleeve in a direction radial of the wire, the lever portion having an engagement element thereon for engaging the common adjustment member.

BRIEF DESCRIPTION OF THE DRAWINGS

One embodiment of the invention will now be described in conjunction with the accompanying drawings in which.

DETAILED DESCRIPTION

A sieve for a combine harvester generally indicated at 10 comprises a generally rectangular frame structure which in the combine is mounted in a support schematically indicated at 11 for forward and rearward movement in the direction of the arrow 12. Underneath the sieve is mounted a fan 13 which directs air upwardly through the sieve as indicated at arrows 14 with the combined effect of the longitudinal movement and the airflow acting to separate the heavier seeds from the lighter crop material so that the seeds fall through openings in the sieve while the lighter crop material moves rearwardly of the top surface of the sieve.

The sieve comprises a plurality of longitudinal rails including two side rails 15 and 16 and a plurality of intermediate rails 17, 18 and 19. The side rails are channel shaped with the web facing inwardly. The intermediate rails are simple flat bar. The number of intermediate rails will of course vary depending upon the width of the sieve and the number shown is purely exemplary.

The rails are interconnected by a plurality of parallel wires 20 which are arranged at right angles to the rails and at spaced positions longitudinally of the rails. Each wire carries a plurality of louver members 21. Each louver member is mounted on the wire and spans the area between one rail and a next adjacent rail. Each wire therefore carries a plurality of louver members equal to the number of spaces between the rails set in the example shown there are four such louver members arranged at positions spaced longitudinally of the respective wire.

Figure 1:
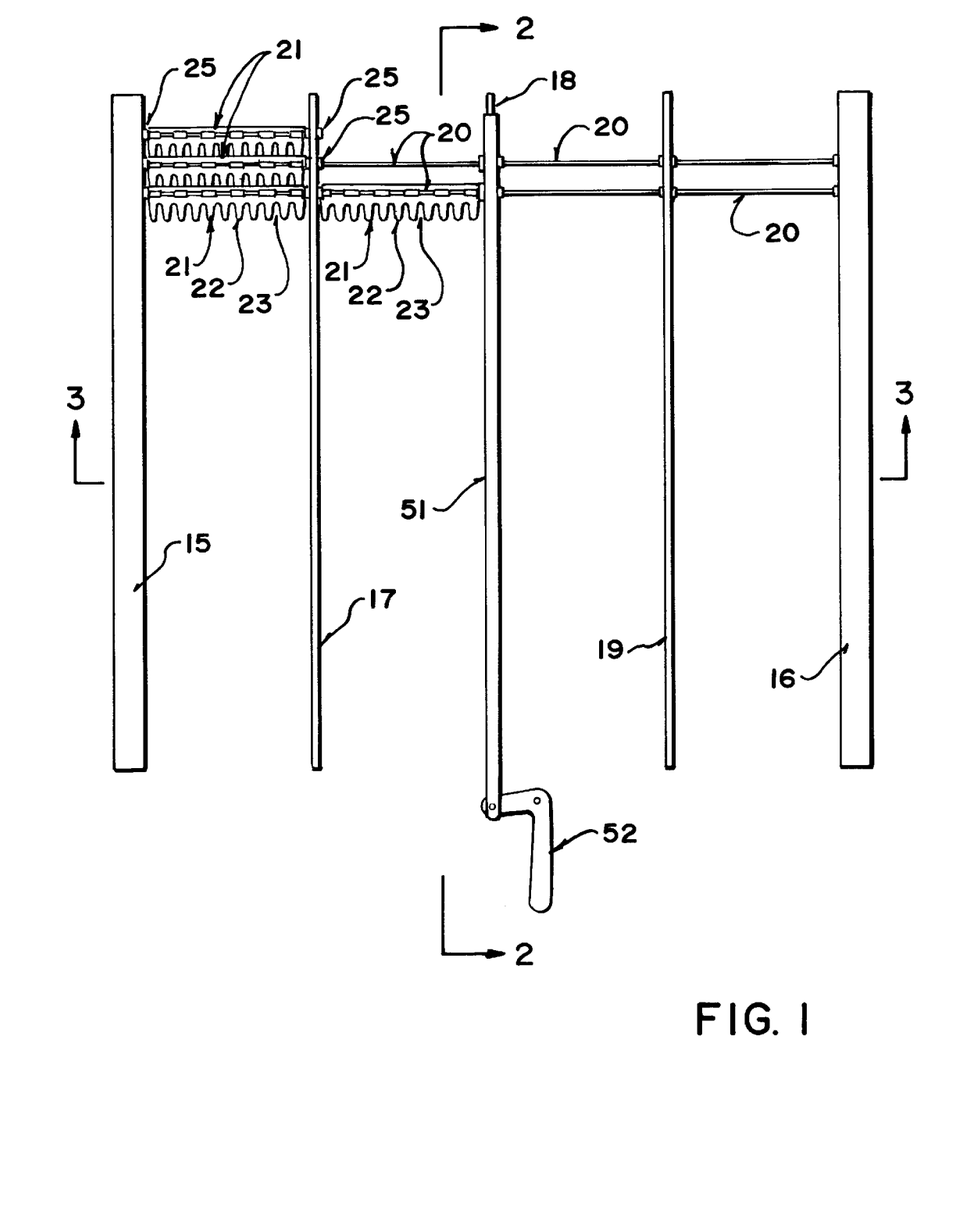
FIG. 1 is a bottom plan view of a sieve according to the present invention.

Each louver member has a series of forwardly projecting fingers 22 leaving between the fingers openings 23. The louver members are arranged so that they slightly overlap as shown in FIG. 1, thus leaving openings between the louver members formed by a portion only of each of the openings 23. The louver members thus cover the whole of the area of the sieve defining the openings therebetween which act in the conventional manner to separate the seeds from the remaining crop material.

Each rail thus has a plurality of holes along its length so that the holes of the rails are aligned in rows with each row receiving a respective one of the wires.

Figure 4:
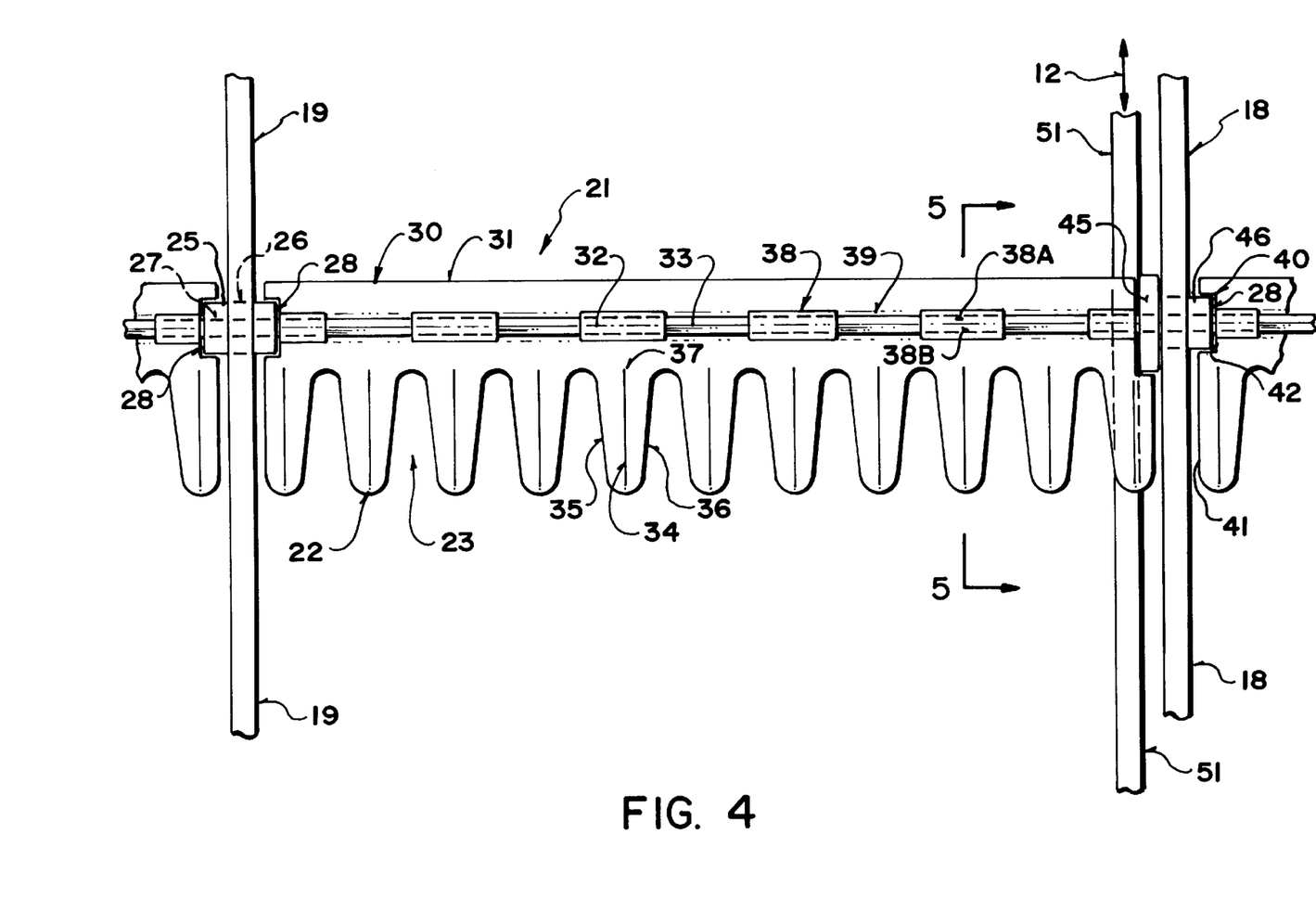
FIG. 4 is a top plan view similar to that of FIG. 1 on a significantly enlarged scale so as to show the details of a single one of the louver sections.
Figure 5:
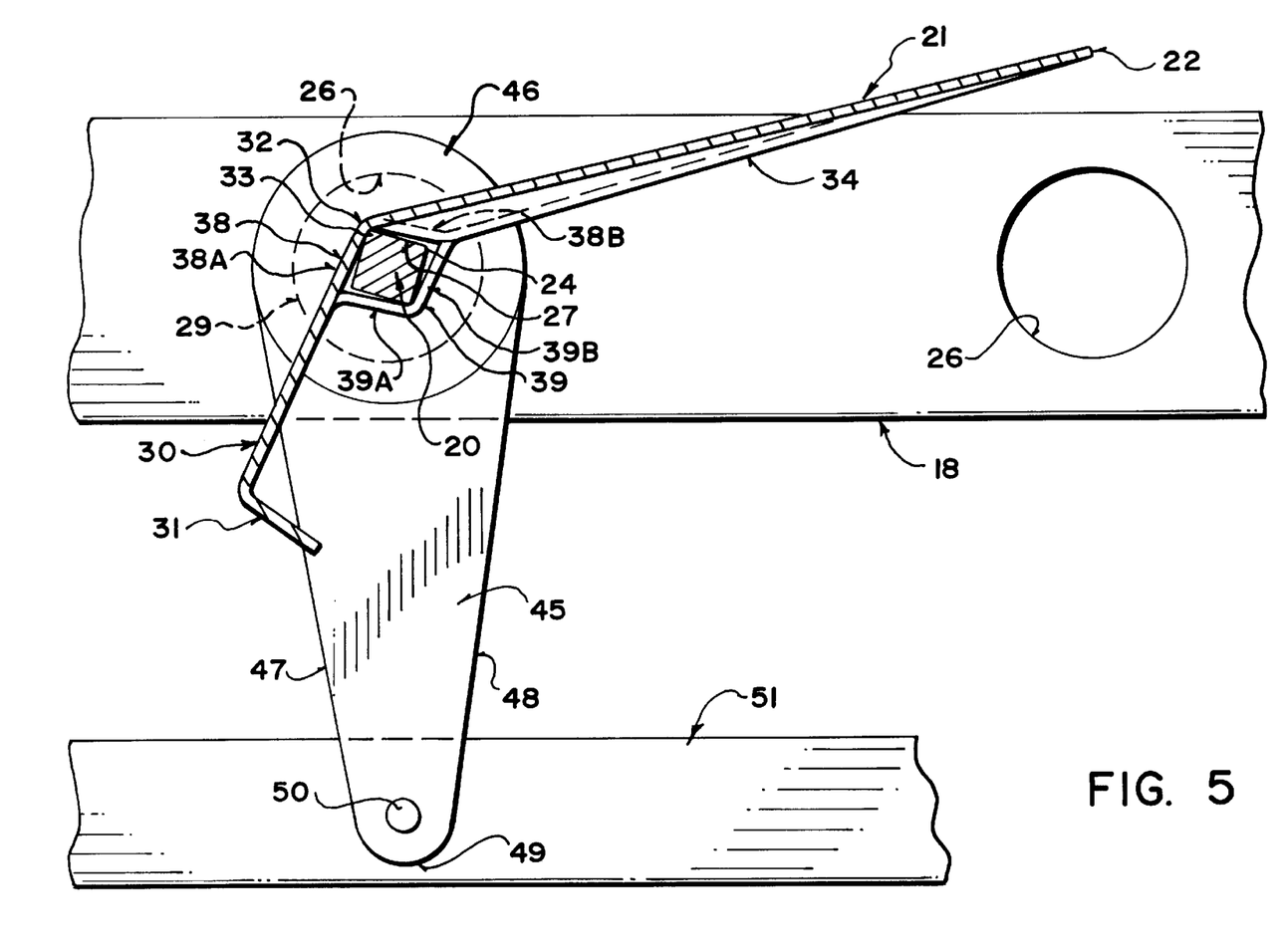
FIG. 5 is a cross sectional view along the lines 5—5 of FIG. 4.

As best shown in the enlarged views of FIGS. 4 and 5, each wire 20 is of square cross section as opposed to the conventional round wires. The square cross section is thus polygonal and provides corners 24 for engagement with the louver sections as described in more detail hereinafter.

Each rail has associated with the respective wire a cushioned member 25 which engages into the hole 26 in the rail. The cushion member is generally sleeve shaped with a cylindrical outer surface engaging into a circular hole in the rail. Thus the cushion member can rotate relative to the rail about an axis longitudinal of the wire. The cushion member has a central hole 27 coaxial with the outside surface 26 which is square so as to match and receive the outside square surface of the wire 20. Thus the cushion member is keyed to the wire for rotation therewith about the axis of the wire by the corners 24. The cushion members 25 at the rails 15, 16, 17 and 19 have a length slightly greater than the thickness of the rail so as to project outwardly to both sides of the rails such that an end face 28 of the cushion member engages a side of the respective louver member.

Each louver member is formed from pressed sheet metal which is cut to form the fingers 22 and the recesses 23. Behind the fingers 22 is a main body 30 of the louver member 21. The main body extends from a rear lip 31 forwardly over the wire 20. The main body is bent at an upper apex 32 at one corner 33 of the wire. Thus the main body forms a tail section which is inclined downwardly and rearwardly relative to the forwardly projecting fingers 22. The main body includes a forward portion in front of the wire which is coplanar with the fingers 22. The fingers are creased at a centre line 34 so as to stiffen the fingers between two side edges 35 and 36 of the fingers. The crease extends rearwardly to a rear end 37 adjacent to but forwardly of the wire. The lip 31 and the creases 34 thus stiffen the structure so as to provide sufficient rigidity in the structure to accommodate the necessary loading forces from the crop material and from the movement of the sieve.

The wire is attached to the louver member by forming a plurality of pockets 38 and 39 in the main body 30 across the width of the louver member. Thus the pockets are arranged alternately in the form of "stitching". The pocket 38 is formed by distorting or punching the main body 30 so as to define two surfaces 38A and 38B extending over the top of the wire and lying in contact with side surfaces of the wire on either side of the corner 33.

The pockets 39 are formed by distorting the main body 30 downwardly so as to form two surfaces 39A and 39B which lie underneath the wire and lie along side the two opposed sides of the wire. The length of the pockets is arranged so that there are a series of the pockets across the width of the louver member and in the embodiment shown there are six pockets 38 and five pockets 39 arranged alternately across the louver member.

The wire can therefore be inserted into the pockets by sliding longitudinally of the louver member. When inserted, the louver member is held against rotation relative to the wire by the engagement of the surfaces of the pockets with the surfaces of the wire.

Thus individual ones of the louver members can be removed and replaced by pulling the wire carrying that louver member from one side rail out of the rails until the louver member to be replaced is unthreaded and released from the wire. When replaced, the louver member can be rethreaded onto the wire by pushing the wire back into place through the louver members and through the cushion members.

Figures 2, 3:
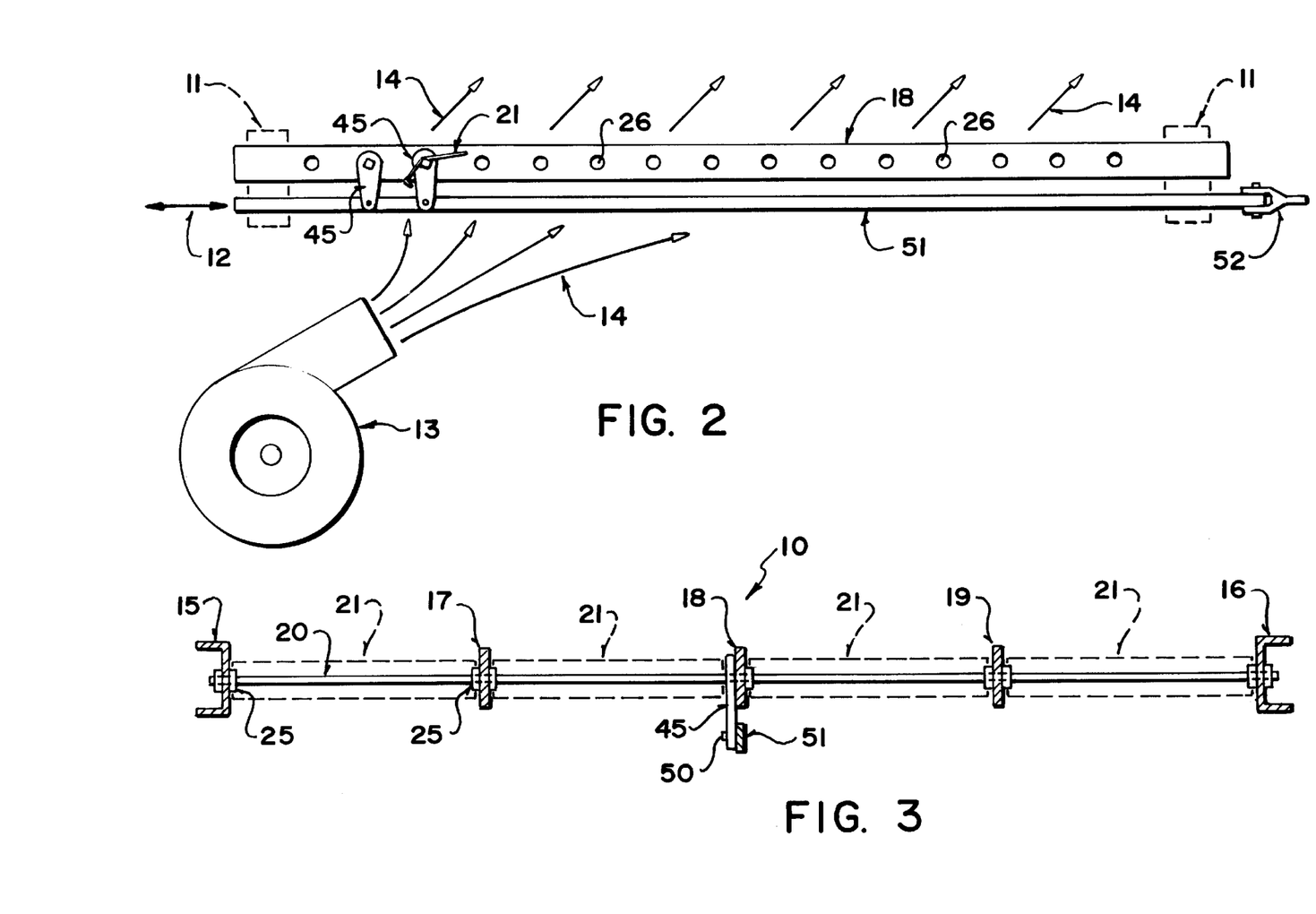
FIG. 2 is a vertical cross sectional view through the sieve of FIG. 1 taken along the lines 2—2 of FIG. 1.
FIG. 3 is a vertical cross sectional view of the sieve of FIG. 1 taken along the lines 3—3 of FIG. 1.

Each louver member has a cut out 40 in the end face 41 of the louver member which is shaped to receive the end of the cushion member so that the end surface 28 of the cushion member is received within the cut-out and butts against the recessed surface portion 42 of the cut-out to hold the edge 41 of the louver member away from the rail. All of the louver members except the one adjacent the rail 18 are shaped with the cut-outs 40 so that each louver member is located by the cushion members between the respective rails. At the rail 18 is provided a modified cushion member which also acts to provide rotation of the wire so as to effect common angular adjustment of the louver members on that wire about the longitudinal axis of the wire. The adjustment member comprises a lever 45 which is attached on one side of a modified cushion member 46 at the rail 18. Thus the lever 45 forms a circular head on the left hand side of the rail 14 and extends from that circular head downwardly with converging sides 47 and 48 to a lower apex 49 at which is located an operating pin 50. The pin 50 extends at right angles to the flat body of the louver 45 into a hole in an actuating rod 51 which extends along the length of the sieve underneath the rail 18 as best shown in FIG. 2 for actuating the lever 45 of each of the wires 20.

The rod 51 is operated by a hand crank 52 at the rear of the sieve for manual adjustment in a conventional manner. The arrangement as described has the following advantages:

1. The louvers can be separated into the individual louver members by pulling the wire from one end rail along its length so that repairs can be made to worn or broken parts.

2. The assembly of the sieve using individual wires allows the sieve to be tailored to particular requirements in that the louver members can be provided with different finger or other shape at different sections in the sieve. This arrangement cannot be achieved in a conventional welded sieve since the welding requires a complex jig which cannot accommodate different shapes of louver.

3. The provision of the cushion members or cushion sleeves between the wires and the rails provides a reduction in a potential wear due to the shaking or movement of the sieve construction during its operation.

4. The location of the louver members by the cushion sleeves reduces movement between the rails and the louver members.

5. The provision of the cushion members which rotate relative to the rails provides an improved adjustment system.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A sieve for use in a combine harvester comprising:

a plurality of longitudinal parallel rails lying in a common plane of the sieve including two spaced side rails and at least one intermediate rail;

each rail having a row of holes therealong;

a plurality of parallel cross wires extending generally at right angles to the rails in the common plane and arranged at longitudinally spaced positions along the rails;

each wire passing through a respective one of the holes in each of the rails such that the holes associated with each wire are aligned across the sieve and such that the wires are supported by the rails;

each wire carrying a plurality of separate louver sections thereon, each louver section having a length along the wire so as to substantially span a distance between a respective pair of the rails such that the louver sections of each wire combine to substantially span a distance between the side rails;

the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;

a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;

each wire being non-circular in cross-section;

each louver section of each wire having formed openings therein shaped to at least partly match with the cross-section of the wire such that the at least partly matching cross sections of the openings and the wire prevent rotation of the louver section relative to the wire in a direction about the axis of the wire and cause said rotation about the axis of the wire of the louver sections carried by the wire in response to rotation of the wire;

and each louver section being connected to the wire by the engagement of the formed openings with the wire without welding to the wire such that the wire can be pulled longitudinally relative to the louver sections carried thereby.

2. The sieve according to claim 1 wherein the wire is shaped in cross-section so as to define corners for engaging the formed openings in the louver sections.

3. The sieve according to claim 1 wherein the holes in the rails each contain a cushion sleeve with an inner bore of the sleeve surrounding the wire and an outer surface of the sleeve engaging the hole in the rail, the inner bore being shaped to match the cross-section of the wire and the outer surface being circular to rotate in the hole with the rotation of the wire.

4. The sieve according to claim 3, wherein the cushion sleeve has a projection portion on at least one end extending beyond an adjacent side surface of the rail, an adjacent one of the louver sections including a recess at a side edge thereof at the wire receiving the projection portion therein.

5. The sieve according to claim 3, wherein the cushion sleeve has a projection portion at each end extending beyond an adjacent side surface of the rail, each adjacent one of the louver sections including a recess at a side edge thereof at the wire receiving a respective one the projection portions therein.

6. The sieve according to claim 1 wherein each of the wires adjusted by said common adjustment member includes an adjustment lever thereon having a base portion with an opening therein shaped to match the cross-section of the wire and a lever portion extending therefrom in a direction radial of the wire, the lever portion having an engagement element thereon for engaging the common adjustment member.

7. The sieve according to claim 6, wherein the common adjustment member comprises a rod extending parallel to the rails underneath the wires with a plurality of holes therein each associated with a respective one of the wires cooperating therewith, the engagement element comprising a pin extending at right angles to the lever portion into a respective one of the holes.

8. The sieve according to claim 1 wherein the holes in the rails each contain a cushion sleeve with an inner bore of the sleeve surrounding the wire and an outer surface of the sleeve engaging the hole in the rail, the inner bore being shaped to match the cross-section of the wire and the outer surface being circular to rotate in the hole with the rotation of the wire and wherein each of the wires adjusted by said common adjustment member includes an adjustment lever thereon having a base portion integral with the cushion sleeve and a lever portion extending from the cushion sleeve in a direction radial of the wire, the lever portion having an engagement element thereon for engaging the common adjustment member.

9. A sieve for use in a combine harvester comprising.
   a plurality of longitudinal parallel rails lying in a common plane of the sieve including two spaced side rails and at least one intermediate rail;
   each rail having a row of holes therealong;
   a plurality of parallel cross wires extending generally at right angles to the rails in the common plane and arranged at longitudinally spaced positions along the rails;
   each wire passing through a respective one of the holes in each of the rails such that the holes associated with each wire are aligned across the sieve and such that the wires are supported by the rails;
   each wire carrying a plurality of separate louver sections thereon, each louver section having a length along the wire so as to substantially span a distance between a respective pair of the rails such that the louver sections of each wire combine to substantially span a distance between the side rails;
   the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;
   a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;
   each wire being noncircular in cross-section;
   each louver section of each wire having formed openings therein shaped to at least partly match with the cross-section of the wire such that the at least partly matching cross sections of the openings and the wire prevent rotation of the louver section relative to the wire in a direction about the axis of the wire and cause said rotation about the axis of the wire of the louver sections carried by the wire in response to rotation of the wire:
   and each louver section being connected to the wire by the engagement of the formed openings with the wire without welding to the wire such that the wire can be pulled longitudinally relative to the louver sections carried thereby;
   wherein the louver sections are formed from sheet metal which is punched and shaped to define said formed openings by alternate raised and depressed portions across the louver section which pass respectively above and below the wire so as to define a duct across the louver section through which the wire passes.

10. The sieve according to claim 9 wherein the louver section includes a plurality of fingers projection forwardly from the wire and defining said openings therebetween, each finger projection forwardly from a respective one of said alternate raised and depressed portions.

11. A sieve for use in a combine harvester comprising:
   a plurality of longitudinal parallel rails lying in a common plane of the sieve including two spaced side rails and at least one intermediate rail;
   each rail having a row of holes therealong;
   plurality of parallel cross wires extending generally at right angles to the rails in the common plane and arranged at longitudinally spaced positions along the rails;
   each wire passing through a respective one of the holes in each of the rails such that the holes associated with each wire are aligned across the sieve and such that the wires are supported by the rails;
   each wire carrying a plurality of separate louver sections thereon, each louver section having a length along the wire so as to substantially span a distance between a respective pair of the rails such that the louver sections of each wire combine to substantially span a distance between the side rails;
   the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;
   a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;
   each wire being non-circular in cross-section;
   each louver section of each wire having formed openings therein shaped to at least partly match with the cross-section of the wire such that the at least partly matching cross sections of the openings and the wire prevent rotation of the louver section relative to the wire in a direction about the axis of the wire and cause said rotation about the axis of the wire of the louver sections carried by the wire in response to rotation of the wire;

wherein the holes in the rails each contain a cushion sleeve with an inner bore of the sleeve surrounding the wire and an outer surface of the sleeve engaging the hole in the rail, the inner bore being shaped to match the cross-section of the wire for rotation of the cushion sleeve with the wire and the outer surface being circular to rotate in the hole with the rotation of the wire.

12. The sieve according to claim 11 wherein the wire is shaped in cross-section so as to define corners for engaging the formed openings in the louver sections.

13. The sieve according to claim 11 wherein the louver sections are formed from sheet metal which is punched and shaped to define alternate raised and depressed portions across the louver section which pass respectively above and below the wire so as to define a duct across the louver section through which the wire passes, the duct being shaped in cross-section to match the cross-section of the wire.

14. The sieve according to claim 13 wherein the louver section includes a plurality of fingers projection forwardly from the wire and defining said openings therebetween, each finger projection forwardly from a respective one of said alternate raised and depressed portions.

15. The sieve according to claim 11 wherein the cushion sleeve has a projection portion on at least one end extending beyond an adjacent side surface of the rail, an adjacent one of the louver sections including a recess at a side edge thereof at the wire receiving the projection portion therein.

16. The sieve according to claim 11 wherein the cushion sleeve has a projection portion at each end extending beyond an adjacent side surface of the rail, each adjacent one of the louver sections including a recess at a side edge thereof at the wire receiving a respective one the projection portions therein.

17. The sieve according to claim 11 wherein each of the wires adjusted by said common adjustment member includes an adjustment lever thereon having a base portion with an opening therein shaped to match the cross-section of the wire and a lever portion extending therefrom in a direction radial of the wire, the lever portion having an engagement element thereon for engaging the common adjustment member.

18. A sieve for use in a combine harvester comprising:

a plurality of longitudinal parallel rails lying in a common plane of the sieve including two spaced side rails and at least one intermediate rail;

each rail having a row of holes therealong;

a plurality of parallel cross wires extending generally at right angles to the rails in the common plans and arranged at longitudinally spaced positions along the rails;

each wire passing through a respective one of the holes in each of the rails such that the holes associated with each wire are aligned across the sieve and such that the wires are supported by the rails;

each wire carrying a plurality of separate louver sections thereon, each louver section having a length along the wire so as to substantially span a distance between a respective pair of the rails such that the louver sections of each wire combine to substantially span a distance between the side rails;

the louver sections of each wire extending from the wire generally longitudinally of the side rails to cooperate with the louver sections of the next wire in defining openings in the sieve for passage of air in an upward direction through the sieve and for passage of seeds in a downward direction through the sieve for separation of the seeds from chaff and for collection of the seeds beneath the sieve;

a common adjustment member for at least some of the wires and arranged such that adjustment movement of the adjustment member causes common rotation of each of said at least some of the wires about a longitudinal axis of the respective wire so as to cause rotation of the louver sections carried thereby to adjust said openings;

each wire being non-circular in cross-section;

each louver section of each wire having formed openings therein shaped to at least partly match with the cross-section of the wire such that the at least partly matching cross sections of the openings and the wire prevent rotation of the louver section relative to the wire in a direction about the axis of the wire and cause said rotation about the axis of the wire of the louver sections carried by the wire in response to rotation of the wire;

wherein the holes in the rails each contain a cushion sleeve with an inner bore of the sleeve surrounding the wire and an outer surface of the sleeve engaging the hole in the rail, the inner bore being shaped to match the cross-section of the wire and the outer surface being circular to rotate in the hole with the rotation of the wire;

and wherein each of the wires adjusted by said common adjustment member includes an adjustment lever thereon having a base portion integral with one of the cushion sleeves and a lover portion extending from the cushion sleeve in a direction radial of the wire, the lever portion having an engagement element thereon for engaging the common adjustment member.

19. The sieve according to claim 18 wherein the wire is shaped in cross-section so as to define corners for engaging the formed openings in the louver sections.

20. The sieve according to claim 18 wherein the louver sections are formed from sheet metal which is punched and shaped to define alternate raised and depressed portions across the louver section which pass respectively above and below the wire so as to define a duct across the louver section through which the wire passes, the duct being shaped in cross-section to match the cross-section of the wire.

21. The sieve according to claim 18 wherein the common adjustment member comprises a rod extending parallel to the rails underneath the wires with a plurality of holes therein each associated with a respective one of the wires cooperating therewith, the engagement element comprising a pin extending at right angles to the lever portion into a respective one of the holes.

* * * * *